(12) United States Patent
Nakano et al.

(10) Patent No.: US 9,120,920 B2
(45) Date of Patent: Sep. 1, 2015

(54) POLYMER COMPOSITION

(75) Inventors: Shigenori Nakano, Ichihara (JP); Kaoru Suzuki, Ichihara (JP); Toshihisa Toyoda, Minato-ku (JP)

(73) Assignee: Du Pont-Mitsui Polychemicals Co., Ltd., Tokyo (JP)

( * ) Notice: Subject to any disclaimer, the term of this patent is extended or adjusted under 35 U.S.C. 154(b) by 645 days.

(21) Appl. No.: 12/994,688

(22) PCT Filed: May 27, 2009

(86) PCT No.: PCT/JP2009/059725
§ 371 (c)(1),
(2), (4) Date: Nov. 24, 2010

(87) PCT Pub. No.: WO2009/145235
PCT Pub. Date: Dec. 3, 2009

(65) Prior Publication Data
US 2011/0071259 A1    Mar. 24, 2011

(30) Foreign Application Priority Data

May 30, 2008   (JP) ................... 2008-143462

(51) Int. Cl.
| C08L 33/02 | (2006.01) |
| C08L 33/04 | (2006.01) |
| C08L 23/08 | (2006.01) |
| C09J 123/08 | (2006.01) |
| C08L 23/10 | (2006.01) |

(52) U.S. Cl.
CPC ....... *C08L 23/0876* (2013.01); *C09J 123/0876* (2013.01); *C08L 23/10* (2013.01); *C08L 2203/162* (2013.01)

(58) Field of Classification Search
CPC .................................. C08L 33/0876

USPC .......................... 525/221, 222, 228
See application file for complete search history.

(56) References Cited

U.S. PATENT DOCUMENTS

| 4,346,196 | A  | * | 8/1982  | Hoh et al. ...................... 525/196 |
| 4,416,937 | A  | * | 11/1983 | Metzger ........................ 442/370 |
| 4,550,141 | A  | * | 10/1985 | Hoh .............................. 525/221 |
| 2001/0020068 | A1 | * | 9/2001 | Sullivan ......................... 525/196 |
| 2005/0159549 | A1 | * | 7/2005 | Kendig et al. ................. 525/119 |
| 2007/0238552 | A1 | * | 10/2007 | Kim et al. ...................... 473/371 |
| 2012/0108754 | A1 | * | 5/2012 | Nakano et al. ................. 525/221 |

FOREIGN PATENT DOCUMENTS

| EP | 1574613 | * | 9/2005 |
| EP | 1897910 |  | 3/2008 |
| JP | 58-215437 |  | 12/1983 |
| JP | 63-104836 |  | 5/1988 |
| JP | 1-49382 |  | 10/1989 |
| JP | 5-011549 |  | 2/1993 |
| JP | 2001-072082 |  | 3/2001 |

OTHER PUBLICATIONS

International Search Report dated Aug. 24, 2009.
European Search Report dated Apr. 28, 2011.

* cited by examiner

*Primary Examiner* — Irina Krylova
(74) *Attorney, Agent, or Firm* — Rankin, Hill & Clark LLP

(57) ABSTRACT

Provided is a polymer composition including (A) an ionomer containing an ethylene/α,β-unsaturated carboxylic acid copolymer and an ethylene/α,β-unsaturated carboxylic acid/α,β-unsaturated carboxylic acid ester terpolymer, and (B) a propylene-based polymer, wherein the mass of constituent units derived from the α,β-unsaturated carboxylic acid ester is from 1 to 4.5% by mass of the entire mass of the ionomer. Through this, a high seal strength may be obtained in a high-temperature range when forming a lock seal, while a high seal strength, as compared with the related art, can be stably obtained over a wide temperature range with a temperature dependence suppressed when forming a peelable seal.

12 Claims, 1 Drawing Sheet

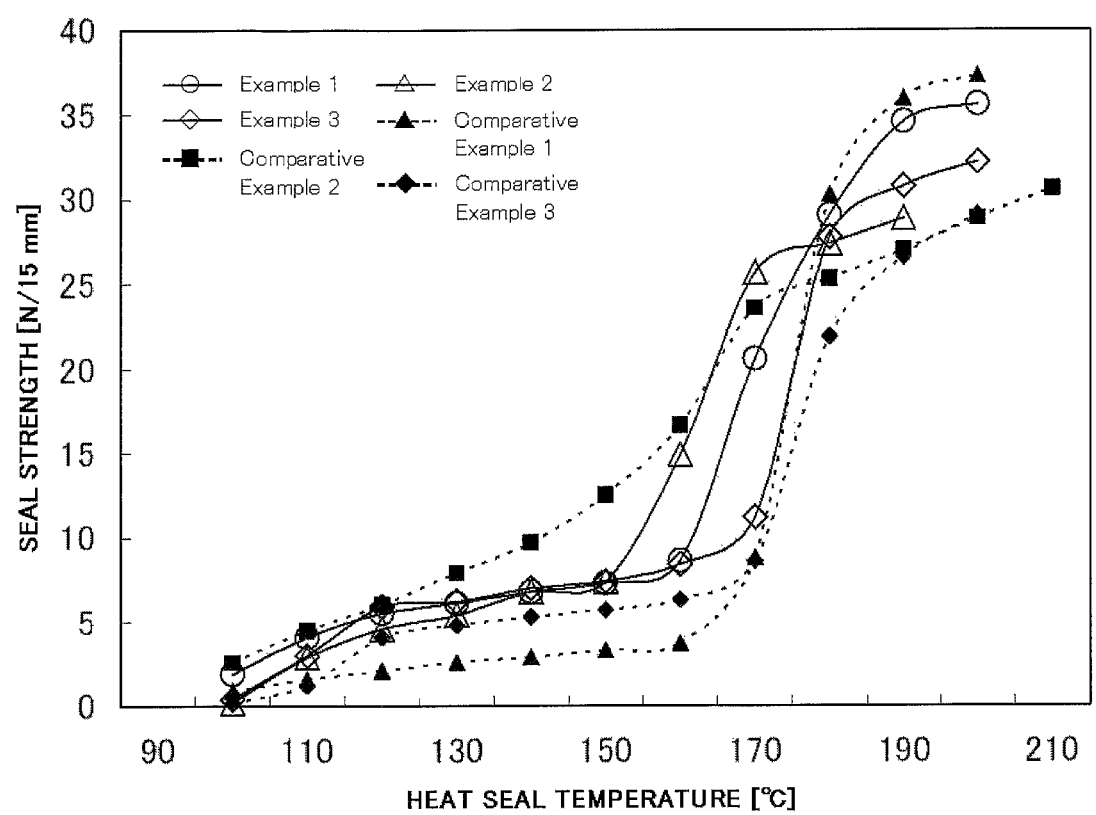

POLYMER COMPOSITION

TECHNICAL FIELD

The present invention relates to a polymer composition which is suitable for heat sealing.

BACKGROUND ART

Conventionally, enclosure and protection of contents during storage, transportation or the like by encapsulating the contents tightly with a packaging material in the form of a tube or a flat film by heat sealing (lock seal) has been carried out. As for the improvement of seal strength in forming a lock seal, various investigations on aspects such as packaging materials, packaging machines, packaging conditions and the like have been conducted, and thus, for example, as the packaging materials, ethylene-based polymers such as polyethylene and an ethylene-vinyl acetate copolymer are known. Among these, ionomers are widely used since they are excellent in, for example, hot tack property, low-temperature seal property, and oil resistance.

On the other hand, when it is desired that the contents be taken out of the packaging material while keeping the contents intact, with a certain degree of a lock seal property, a method for heat sealing in which a sealing section can be peeled and opened by an opening force (peelable seal) is also carried out.

For example, a polymer material containing 80 to 93% by mass of an ethylene/acid ionomer and 7 to 20% by mass of a propylene/α-olefin copolymer is disclosed (see, for example, Patent Document 1), in which the lock seal and the peelable seal can be formed under the control of temperatures. When this polymer material is used to form a film or a laminate for filling and packaging by a packaging machine, it is possible to obtain a package having both a lock seal section and a peelable seal section in one packaging material, by forming the lock seal on the back side or bottom under high temperature conditions and forming the peelable seal at the top under low temperature conditions. As the polymer material to be used for such a package, for example, a laminated packaging material in which a base layer such as a polyester layer, and an ionomer layer are laminated with an adhesive layer interposed therebetween, and the like are known. In this laminated packaging material, it is necessary to exhibit a seal strength of about 4 N/10 mm width under low-temperature sealing conditions (e.g.: about 100 to 130° C.) and a seal strength of 10 N/10 mm width or higher at high-temperature sealing conditions (e.g.: 150° C. or higher) in terms of the relationship between the sealing temperature and the seal strength.

Furthermore, in practice, it is necessary to stably form the lock seal and the peelable seal. In particular, it is required to have a temperature range in which the peelable seal can be formed stably, that is, the temperature range in which the seal strength of the peelable seal section does not vary significantly depending on the temperature.

As a technique regarding such a seal form, a laminated film for packaging, which is provided a seal layer of a polymer composition formed of 60 to 95 parts by mass of a metal salt of an ethylene/α,β-unsaturated carboxylic acid-based copolymer and 40 to 5 parts by mass of an ethylene/α,β-unsaturated carboxylic acid ester copolymer, is disclosed (see, for example, Patent Document 2). Here, it is considered that a seal strength that is relatively low and also constant over a wide temperature range can be obtained, and a high seal strength is exhibited under high-temperature sealing conditions.

Furthermore, a blend of an ionomer containing 5 to 25% by mass of a unit derived from isobutyl acrylate, in addition to a unit derived from ethylene and an acid, and a propylene copolymer is disclosed (see, for example, Patent Document 1).

Moreover, as for a means for establishing a difference in the seal strength by changing the seal temperature, it is disclosed that a sealant layer of a composition containing an ionomer resin or a composition obtained by the blending of two or more kinds of resins having different melting points and an ionomer resin is provided as the seal layer (see, for example, Patent Document 3). The sealant layer including this ionomer resin is characterized in that there is a slope rising gently toward one side along with the elevation of the seal temperature.

In addition, there is a disclosure of a seal layer having an easily peelable property, in which the seal layer is formed of the composition of an ionomer, an ethylene/methacrylic acid copolymer, polypropylene, and an inorganic filler (see, for example, Patent Document 4). The seal layer including this composition is considered to exhibit a seal strength of 1.5 to 2 N/15 mm.

PATENT DOCUMENT

Patent Document 1: Japanese Examined Patent Application Publication (JP-B) No. 1-49382
Patent Document 2: JP-B No. 5-11549
Patent Document 3: Japanese Patent Application Laid-Open Publication (JP-A) No. 2001-72082
Patent Document 4: JP-A No. 63-104836

DISCLOSURE OF THE INVENTION

Problem to be Solved by the Invention

However, the seal strength in the peelable seal portion formed in a low-temperature range is necessarily not sufficient in the response to various applications such as transportation and handling. Materials having a wide temperature range in which the seal strength in the peelable seal portion can be rendered higher, and further a peelable seal can be formed with the seal strength, are desirable. That is, a technology that may suppress a temperature dependence for obtaining a higher seal strength (for example, 5 to 10 N/15 mm), as compared with the related art, over a wide temperature range when forming a peelable seal at a low temperature while keeping a higher seal strength in a lock seal portion formed by heating at a high temperature has not yet been established.

The present invention has been made taking the above-described situation into consideration. Under such the situation, there is a demand for a polymer composition, in which in forming a peelable seal, a high seal strength, as compared with the related art, can be stably obtained over a wide temperature range with a temperature dependence suppressed, while a high seal strength in a high-temperature range in forming a lock seal can be obtained (for example, 20 N/15 mm or higher at 180° C. or higher).

Means for Solving the Problem

The present invention is based on knowledge that if a copolymerization ratio of unsaturated carboxylic acid esters in the copolymerization components of an ethylene-based copolymer is less than a predetermined ratio, the seal strength when forming a peelable seal in a low-temperature range (for example, 100 to 150° C.) is higher, as compared with the related art, and the seal strength can be stably maintained with a small variation over a wide temperature range while not changing significantly with temperature.

Specific means for accomplishing the above-described objects are as follows. Specifically, the present invention provides:

<1> a polymer composition including (A) an ionomer containing an ethylene/α,β-unsaturated carboxylic acid copolymer and an ethylene/α,β-unsaturated carboxylic acid/α,β-unsaturated carboxylic acid ester terpolymer, and (B) a propylene-based polymer, wherein the mass of constituent units derived from the α,β-unsaturated carboxylic acid ester is from 1 to 4.5% by mass of the entire mass of the (A) ionomer.

In the polymer composition as described in <1>, it is preferable that the content of the (A) ionomer is from 85 to 95 parts by mass based on 100 parts by mass of the polymer composition, and the content of the (B) propylene-based polymer is from 5 to 15 parts by mass based on 100 parts by mass of the polymer composition.

<2> The polymer composition as described in <1>, wherein the degree of neutralization of acid group in the ionomer is from 10 to 40%.

<3> The polymer composition as described in <1> or <2>, wherein the α,β-unsaturated carboxylic acid ester of the ethylene/α,β-unsaturated carboxylic acid/α,β-unsaturated carboxylic acid ester terpolymer is a lower alkyl ester of an α,β-unsaturated carboxylic acid, an alkyl group of the alkyl ester having from 2 to 5 carbon atoms.

<4> The polymer composition as described in any one of <1> to <3>, including at least two kinds of terpolymers having different melt flow rates (MFR; 190° C., load 2.16 Kg) as the ethylene/α,β-unsaturated carboxylic acid/α,β-unsaturated carboxylic acid ester terpolymer, wherein the ratio of MFRs (high MFR/low MFR) of the two kinds of terpolymers selected from the terpolymers is from 2 to 5.

In addition, the "MFR" in the present invention is a value measured at 190° C. or 230° C. and a load of 2160 g in accordance with JIS K 7210-1999. The same shall apply hereinafter.

<5> The polymer composition as described in <4>, wherein the MFR value of one terpolymer having a higher MFR between the two kinds of terpolymers is from 20 to 60.

<6> The polymer composition as described in <5>, wherein the α,β-unsaturated carboxylic acid constituting the ethylene/α,β-unsaturated carboxylic acid copolymer and the terpolymers is selected from an acrylic acid and a methacrylic acid, and the α,β-unsaturated carboxylic acid ester constituting the terpolymer is selected from a lower alkyl ester of an acrylic acid, an alkyl group of the alkyl ester having from 2 to 5 carbon atoms, and a lower alkyl ester of a methacrylic acid, an alkyl group of the alkyl ester having from 2 to 5 carbon atoms.

In the polymer composition as described in <5>, it is preferable that the α,β-unsaturated carboxylic acid ester constituting the terpolymers is an alkyl ester of an acrylic acid, an alkyl group of the alkyl ester having 4 carbon atoms.

Furthermore, in the polymer composition as described in <1>, it is preferable that the mass of constituent units derived from the α,β-unsaturated carboxylic acid ester is from 2 to 4% by mass of the entire mass of the (A) ionomer.

Moreover, in the polymer composition as described in <1>, it is more preferable that the (A) ionomer is formed of an ethylene/(meth)acrylic acid copolymer, an ethylene/(meth)acrylic acid/(meth)acrylic acid ester terpolymer having a melt flow rate (MFR) of more than 30 and 50 or less, and an ethylene/(meth)acrylic acid/(meth)acrylic acid ester terpolymer having an MFR from 1 to 30, and is a Zn ionomer with an MFR ratio (high MFR/low MFR) of 2 to 5, and the (B) propylene-based polymer is a propylene/ethylene copolymer. In this case, it is more preferable that the MFR ratio (high MFR/low MFR) is from 3 to 4, and the MFR of the (B) propylene-based polymer is from 0.5 to 100 g/10 min.

Effect of the Invention

According to the present invention, a polymer composition, in which a high seal strength, as compared with the related art, can be stably obtained over a wide temperature range with a temperature dependence suppressed when forming a peelable seal, while a high seal strength in a high-temperature range when forming a lock seal can be obtained (for example, 20 N/15 mm or higher at 180° C. or higher), can be provided.

BRIEF DESCRIPTION OF THE DRAWINGS

FIG. 1 is a graph showing the change of seal strength depending on the seal temperature.

BEST MODE FOR CARRYING OUT THE INVENTION

Hereinbelow, the polymer composition of the present invention will be described in detail.

The polymer composition of the present invention includes an ionomer including (A) an ionomer containing an ethylene/α,β-unsaturated carboxylic acid copolymer and an ethylene/α,β-unsaturated carboxylic acid/α,β-unsaturated carboxylic acid ester terpolymer (preferably from 85 to 95 parts by mass based on 100 parts by mass of the polymer composition), and (B) a propylene-based polymer (preferably from 5 to 15 parts by mass based on 100 parts by mass of the polymer composition), wherein the mass ratio of the constituent units derived from the α,β-unsaturated carboxylic acid ester in the (A) above is adjusted to be in the range of from 1 to 4.5% by mass of the entire mass of the ionomer.

In the present invention, by including the unsaturated carboxylic acid ester in temperature range kept at a copolymerization ratio of 4.5% by mass or less in the copolymerization components constituting the ethylene-based copolymer in the ionomer, the seal strength in low-temperature sealing is increased, and the temperature dependence of the thus increased seal strength is suppressed to be low over a wide temperature range (for example, 100 to 150° C.). As a result, a peelable seal portion having a high seal strength, as compared with the related art, may be stably formed. Furthermore, there is no case where the seal strength in forming a lock seal in a high-temperature range is severely impaired.

(A) Ionomer

The polymer composition of the present invention includes at least one kind of ionomer containing an ethylene/α,β-unsaturated carboxylic acid copolymer and an ethylene/α,β-unsaturated carboxylic acid/α,β-unsaturated carboxylic acid ester terpolymer (hereinafter also referred to as the "tercopolymer in the present invention"). The ionomer of the present invention is formed by the crosslinking of at least one kind or two or more kinds of the ethylene/α,β-unsaturated carboxylic acid copolymer and at least one kind or two or more kinds of the tercopolymer in the present invention by metal ions.

The "ethylene/α,β-unsaturated carboxylic acid copolymer" constituting the ionomer is a polymer formed by copolymerization of at least an ethylene and monomer selected from an α,β-unsaturated carboxylic acid as the copolymerization components, and if necessary, monomer other than the unsaturated carboxylic acid may be copolymerized therein. The ethylene/α,β-unsaturated carboxylic acid copolymer constituting the ionomer is preferably a bicopolymer formed of an ethylene and an α,β-unsaturated carboxylic acid copolymer from the point of increasing the seal strength of the peelable seal portion formed by low-temperature sealing to a higher value, as compared with the related art, and the seal strength is obtained stably over a wide temperature range.

Examples of the α,β-unsaturated carboxylic acid include unsaturated carboxylic acids having from 4 to 8 carbon atoms such as an acrylic acid, a methacrylic acid, an ethacrylic acid, an itaconic acid, an anhydrous itaconic acid, a fumaric acid, a crotonic acid, a maleic acid, an anhydrous maleic acid, maleate monoesters (monomethyl maleate, monoethyl maleate, and the like), anhydrous maleate monoesters (anhydrous monomethyl maleate, anhydrous monoethyl maleate, and the like) and the like, and salts thereof with monovalent metals (for example, lithium, potassium, sodium, and the like) or salts thereof with polyvalent metals (for example, magnesium, calcium, zinc, and the like), and others.

Among these, an acrylic acid, a methacrylic acid, a maleic acid, an anhydrous maleic acid, maleate monoesters, anhydrous maleate monoesters, and salts thereof with monovalent or polyvalent metals are preferable, and a acrylic acid or a methacrylic acid, and salts thereof with monovalent or polyvalent metals are particularly preferable.

Specific examples of the ethylene/α,β-unsaturated carboxylic acid copolymer include an ethylene/acrylic acid copolymer, an ethylene/methacrylic acid copolymer, and the like, or ionomers thereof (for example, Na and Zn ionomers; details of the metal ion will be described later), and the like. Also, as a commercially available product of the ethylene/α,β-unsaturated carboxylic acid copolymer, for example, trade name HIMILAN series and trade name NUCREL series (both manufactured by DuPont-Mitsui Polychemicals Co., Ltd.), SURLYN series (manufactured by DuPont Co., Ltd. (US)), or the like can be used.

The polymerization ratio (mass ratio) of the constituent units derived from the α,β-unsaturated carboxylic acid in the ethylene/α,β-unsaturated carboxylic acid copolymer is preferably 1 to 25% by mass, and more preferable 2 to 20% by mass. If the copolymerization ratio of the α,β-unsaturated carboxylic acid is 1% by mass or more, and preferably 2% by mass or more, it is advantageous from the viewpoint of a low-temperature seal property.

The melt flow rate of the ethylene/α,β-unsaturated carboxylic acid copolymer is preferably in the range of 0.01 to 500 g/10 min, particularly preferably 0.1 to 100 g/10 min., and even more preferably 0.5 to 60 g/10 min. If the melt flow rate is in the above-described range, it is advantageous from the viewpoint of film formability.

The "ethylene/α,β-unsaturated carboxylic acid/α,β-unsaturated carboxylic acid ester terpolymer" (the tercopolymer in the present invention) constituting the ionomer is a polymer formed by copolymerization of at least ethylene, the monomer selected from an α,β-unsaturated carboxylic acids, and the monomer selected from α,β-unsaturated carboxylic esteres as the copolymerization components, and if necessary, other monomer may be copolymerized therein within a range not adversely affecting the purpose of the present invention.

The α,β-unsaturated carboxylic acid to be copolymerized as the copolymerization component of the tercopolymer in the present invention has the same meaning as the α,β-unsaturated carboxylic acid in the case of the (A) ethylene/α,β-unsaturated carboxylic acid copolymer, and it also includes a salt of the unsaturated carboxylic acid. Further, examples, preferable forms, and the like of the α,β-unsaturated carboxylic acid are also the same as those of the α,β-unsaturated carboxylic acid in the case of the (A) ethylene/α,β-unsaturated carboxylic acid copolymer.

The polymerization ratio (mass ratio) of the constituent units derived from the α,β-unsaturated carboxylic acid in the tercopolymer in the present invention is preferably 1 to 25% by mass, and more preferably 2 to 20% by mass. Further, the polymerization ratio (mass ratio) of the constituent units derived from the α,β-unsaturated carboxylic acid ester in the tercopolymer in the present invention is preferably 1 to 25% by mass, and more preferably 2 to 20% by mass.

Furthermore, examples of the "α,β-unsaturated carboxylic acid ester" to be copolymerized as the copolymerization component of the tercopolymer in the present invention include the above-described esters of the α,β-unsaturated carboxylic acid, preferably lower alkyl esters containing alkyl group having from 2 to 5 carbon atoms of the α,β-unsaturated carboxylic acid, and more preferably alkyl esters containing alkyl group having 4 carbon atoms such as an isobutyl, a n-butyl, and the like of the α,β-unsaturated carboxylic acid.

Specific examples of the α,β-unsaturated carboxylic acid ester include ester compounds such as methyl acrylate, ethyl acrylate, isopropyl acrylate, isobutyl acrylate, n-butyl acrylate, isooctyl acrylate, methyl methacrylate, isobutyl methacrylate, dimethyl maleate and the like. Among these, lower alkyl esters (having from 2 to 5 carbon atoms) of acrylic acids or methacrylic acids, such as methyl acrylate, ethyl acrylate, isopropyl acrylate, isobutyl acrylate, n-butyl acrylate, methyl methacrylate, and isobutyl methacrylate are preferable. Further, n-butyl esters or isobutyl esters of acrylic acids or methacrylic acids are preferable, alkyl esters containing alkyl group having 4 carbon atoms of acrylic acids are more preferable, and isobutyl esters are particularly preferable.

Further, the polymerization ratio (mass ratio) of the constituent units derived from the α,β-unsaturated carboxylic acid ester in the ionomer is from 1 to 4.5% by mass based on the entire mass of the ionomer. If the ratio of the constituent units derived from the α,β-unsaturated carboxylic acid ester is more than 4.5% by mass, the properties of the packaging are worsened due to excessive flexibility and tackiness, and also the seal strength tends to be lowered. Accordingly, a predetermined range of stable seal strength cannot be obtained over a wide temperature range. In addition, a polymerization ratio of 1% by mass or more indicates that the constituent units derived from the α,β-unsaturated carboxylic acid ester is contained in an active amount, whereas if the polymerization ratio is less than 1% by mass, the effect from the α,β-unsaturated carboxylic acid ester is insufficient, and the temperature range in which the peelable seal can be formed is narrow.

Among those, the polymerization ratio (mass ratio) of the constituent units derived from the α,β-unsaturated carboxylic acid ester is preferably from 2 to 4% by mass, and more preferably from 3 to 4% by mass, based on the entire mass of the ionomer, from the viewpoint of obtaining a desired stable seal strength in low-temperature sealing (peelable seal) over a wide temperature range.

The ionomer of the present invention includes at least the ethylene/α,β-unsaturated carboxylic acid copolymer, the tercopolymer in the present invention, and metal ions for neutralizing the same, forming a structure in which the carboxylic acid groups present on the branch chain of the molecule between these molecule chains are crosslinked by the metal ions. Examples of the metal ion include ions of monovalent metals such as lithium, sodium, potassium, and cesium, ions of bivalent metals such as magnesium, calcium, strontium, barium, copper, and zinc, ions of trivalent metals such as aluminum and iron, and the like. Among these, as the metal ions, sodium and zinc are preferable since they are excellent with respect to the seal property of the seal section.

The degree of neutralization of the ionomer is preferably 10% or more. The degree of neutralization of the ionomer is preferably from 10 to 40%, particularly preferably from 10 to 25%, and more preferably from 10 to 20%. If the degree of neutralization is 10% or more, the strength of the heat sealing portion may be increased, whereas if the degree of neutralization is 40% or less, it is advantageous from the viewpoint of flowability in forming.

The melt flow rate (MFR) of the tercopolymer in the present invention is preferably in the range of 0.01 to 500 g/10 min., particularly preferably 0.1 to 100 g/10 min., and more preferably 0.5 to 60 g/10 min.

The ionomer includes two kinds or three or more kinds of tercopolymers having different melt flow rates (MFR) as the tercopolymer in the present invention, and among any of the combinations of two kinds of tercopolymer, a combination in which the MFR ratio (high MFR/low MFR) of the MFR value of the tercopolymer having a high MFR (high MFR) to the MFR value of the tercopolymer having a low MFR (low MFR) is preferably in the range of 2 to 5 is preferable. If two kinds of tercopolymer having the above MFR ratio in the range of 2 to 5 are included, a higher seal strength (for example, 5 to 10 N/15 mm), as compared with the related art, can be stably obtained with a temperature dependence suppressed over a wide temperature range (for example, 100 to 150° C.) in the peelable seal portion which has been sealed at low-temperature. The ratio of the higher MFR/lower MFR is more preferably in the range of 3 to 4.

For two kinds of tercopolymer comparing the MFRs, the MFR value of the tercopolymer having a high MFR (high MFR) is in the range of 20 to 60 g/10 min., preferably in the range of 30 to 50 g/10 min., and more preferably in the range of 30 to 40 g/10 min. If the MFR value is in this range, it is effective for improvement of the peel seal strength.

In this case, the MFR value of the tercopolymer having a low MFR (low MFR) is preferably in the range of 1 to 30 g/10 min.

Among the combinations of the above-described two kinds of tercopolymer, the combinations where the MFR ratio (high MFR/low MFR) is in the range of 3 to 4 and the MFR value of the tercopolymer having a high MFR (high MFR) is in the range of 30 to 40 g/10 min are preferable from the viewpoint of improvement of the peel seal strength.

The ionomer used for the preparation of the polymer composition of the present invention may be, in addition to (1) one obtained by using the terpolymer in the present invention and the ethylene/α,β-unsaturated carboxylic acid copolymer (both not including the ionomer), and a metal compound, (2) one obtained by mixing the terpolymer (not including the ionomer) in the present invention and the ionomer of the ethylene/α,β-unsaturated carboxylic acid copolymer, (3) one obtained by mixing the ionomer of the terpolymer in the present invention and the ionomer of the ethylene/α,β-unsaturated carboxylic acid copolymer, (4) one obtained by mixing the ethylene/α,β-unsaturated carboxylic acid copolymer (not including the ionomer) and the ionomer of the terpolymer in the present invention, (5) one obtained by mixing the ethylene/α,β-unsaturated carboxylic acid copolymer and the terpolymer in the present invention (both not including the ionomer), and the ionomer of the terpolymer in the present invention, or the like.

(B) Propylene-Based Polymer

The polymer composition of the present invention includes at least one kind of propylene-based polymer. By including the propylene-based polymer, the temperature range in which a peelable seal at a low temperature may be formed is widened.

Examples of the propylene-based polymer include, for example, a high-crystallinity polymer selected from the group consisting of propylene homopolymers and propylene-based copolymers obtained by copolymerization of propylene and other monomer.

Examples of the propylene-based copolymer include random copolymers, block copolymers, alternate copolymers, or the like of propylene and an ethylene and/or α-olefin (preferably having 4 to 8 carbon atoms), and the random copolymers are preferred since they are excellent in film formability and flexibility.

The MFR (230° C., a load condition 2.16 Kg) of the propylene-based polymer is preferably from 0.5 to 100 g/10 min., particularly preferably 1 to 50 g/10 min, and more preferably 1 to 20 g/10 min.

As the type of the polymer composition of the present invention, the following types of combinations (1) to (3) are preferred since the effect of the present invention is further enhanced.

(1) A combination in which the (A) is a Zn ionomer formed of an ethylene/(meth)acrylic acid copolymer and an ethylene/(meth)acrylic acid/(meth)acrylic acid ester terpolymer, and the (B) is a propylene/ethylene copolymer.

(2) A combination in which the (A) is a Zn ionomer formed of an ethylene/(meth)acrylic acid copolymer, an ethylene/(meth)acrylic acid/(meth)acrylic acid ester terpolymer having 30<MFR≤50, and an ethylene/(meth)acrylic acid/(meth)acrylic acid ester terpolymer having 1≤MFR≤30, and have from 2 to 5 of an MFR ratio (high MFR/low MFR), and the (B) is a propylene/ethylene copolymer.

(3) Further, in the (1) to (2) above, a case where the MFR ratio (high MFR/low MFR) is from 3 to 4 and the MFR of the (B) is from 0.5 to 100 g/10 min. is preferred from the viewpoint of the peel seal strength.

In the polymer composition of the present invention, it is preferable that the content of the ionomer is in the range of 85 to 95 parts by mass based on 100 parts by mass of the polymer composition and the content of the propylene-based polymer is in the range of 5 to 15 parts by mass based on 100 parts by mass of the polymer composition. In the present invention, it is possible to promote the improvement of the seal strength when forming a peelable seal at such a mixing ratio, and also the extension of the temperature range in which such the strength can be obtained. That is, when the mixing ratio of the ionomer and the propylene-based polymer have the relationship above, the lock seal at a high temperature is maintained at a high strength while a higher seal strength, as compared with the related art, that is stable when forming a peelable seal at a low temperature, is obtained.

Specifically, when the content of the ionomer is 85 parts by mass or more, or the content of the propylene-based polymer is 15 parts by mass or less, the seal strength (particularly, the seal strength when forming a lock seal at a high temperature) is good, and a balance between the easiness in opening and the seal strength in the peelable seal portion is obtained. On the other hand, when the content of the ionomer is 95 parts by mass or less, or 5 parts by mass or more, the content of the propylene-based polymer is not relatively too low and the ease of opening property in the peelable seal portion is maintained, thereby avoiding a decrease in the width of the temperature range in which the peelable seal can be formed.

Among those, it is preferable that the content of the ionomer is in the range of 90 to 95 parts by mass based on 100 parts by mass of the polymer composition and the content of the propylene-based polymer is in the range of 10 to 5 parts by mass based on 100 parts by mass of the polymer composition.

To the polymer composition of the present invention, in addition to the above-described components, if necessary, within a range not adversely affecting the effect of the present invention, additives such as an antioxidant, a weather-resistant stabilizer, a lubricant, an anti-clouding agent and the like may be further added. Also, a polyolefin resin may be added, and the balance between the peelable seal property and the lock seal property may be adjusted. Examples of the polyolefin resin include ethylene-based polymers and copolymers such as a high-density polyethylene and a low-density polyethylene, polybutene, other olefinic (co)polymers, a blend of these polymers, and the like.

Preparation of the polymer composition of the present invention can be carried out by dry-blending or melt-blending at least the (A) ionomer and the (B) propylene-based polymer simultaneously or sequentially. When using the dry-blending, both of the (A) and (B) are melt and plasticized in a molding machine, and thus homogeneously melt-mixed. When using the melt-blending, a single screw extruder, a twin screw extruder, various mixers such as a Banbury mixer, rolls, various kneaders, or the like can be used for the melt-mixing. In terms of the mixing property, melt-blending is preferable. The mixing sequence is not particularly limited.

The polymer composition of the present invention may be provided on various substrates such as polyesters such as polyethylene terephthalate, polyamides, polyvinylidene chloride, a saponified ethylene-vinyl acetate copolymer, polystyrene, polybutene, polypropylene, polyethylene, paper, aluminum foil, metal-deposited films, and the like as sealing materials, and then used. The polymer composition may be provided on the substrate via an adhesive, or directly on the substrate surface. As the adhesive, a known anchor coating agent such as adhesive compositions obtained by blending a crosslinking agent with several individual ones or a mixture therefrom, ethylene-based resins such as a high-pressure polyethylene, a polyester polyol, or a polyester urethane polyol that has undergone chain elongation by a bifunctional or higher isocyanate compound, and the like can be selected.

The methods for providing the polymer composition of the present invention on a substrate will be described by way of examples. The following methods may be applied in combination.

(1) Thermal Adhesiveness Method

This is a method in which the polymer composition of the present invention is molded in the form of a film in advance, and the molded product is loaded on the substrate via an adhesive agent, and subjected to thermocompression, or alternatively the adhesive agent is laminated in advance on at least one side of the surface of the substrate or the molded product by a coextrusion method, an extrusion coating method, or the like and then thermocompression is conducted.

(2) Sandwich Lamination Method

This is a method in which the polymer composition of the present invention is molded in the form of a film in advance, and the molded product and a substrate are pasted via a fusion film of an adhesive agent by a T-die method or the like.

(3) Coextrusion Method

This is a method in which a base resin and the polymer composition of the present invention, or a base resin, an adhesive agent, and the polymer composition of the present invention are laminated by a coextrusion molding method.

(4) Compression/Adhesion Method Using Adhesive Agent

This is a method in which the polymer composition of the present invention is made into a molded product in the form of a film in advance, and an adhesive agent is applied on one side or both sides of the molded product or a substrate, and then subjected to compression and adhesion.

In addition, the surface of the substrate on which the polymer composition of the present invention is provided may be preliminarily subjected to a known surface treatment such as, for example, a corona discharge treatment in order to improve the adhesive force.

EXAMPLES

Hereinbelow, the present invention will be described in detail with reference to Examples, but the present invention is not limited to the following Examples within a scope not departing from the gist of the invention.

Example 1

Preparation of Polymer Composition

The components in the following composition are used and melt-kneaded by a single screw extruder (40 mmϕ, tip of a Dulmadge screw) under the conditions of a resin temperature of 170° C. and a screw rotation rate of 50 rpm, thereby preparing a polymer composition having an MFR of 4.8 g/10 min. The details of the blending and obtained polymer composition are shown in Tables 1 and 2 below. However, in Table 2 below, the MAA amount is the ratio of the ionomer (remaining after the removal of the propylene copolymer from the polymer composition) in the polymer composition. The IBA amount is the ratio of the ionomer (remaining after the removal of the propylene copolymer from the polymer composition) in the polymer composition. The degree of neutralization is a degree of neutralization of the acid group in the ionomer (remaining after the removal of the propylene copolymer from the polymer composition) in the polymer composition.

<Composition>
Ionomer 1
Zinc ionomer [degree of neutralization 36%, MFR (190° C., 2160 g load) 1.5 g/10 min.] of an ethylene/methacrylic acid copolymer [methacrylic acid content 12% (mass ratio)]
Ionomer 2
Zinc ionomer [degree of neutralization 70%, MFR (190° C., 2160 g load) 1.0 g/10 min.] of an ethylene/methacrylic acid/isobutyl acrylate copolymer [methacrylic acid content 10% (mass ratio), isobutyl acrylate content 10% (mass ratio)]
EMAA1
An ethylene/methacrylic acid/isobutyl acrylate copolymer [methacrylic acid content 11% (mass ratio), isobutyl acrylate content 8% (mass ratio), MFR (190° C., 2160 g load) 10.0 g/10 min.]
EMAA2
An ethylene/methacrylic acid/isobutyl acrylate copolymer [methacrylic acid content 10% (mass ratio), isobutyl acrylate content 10% (mass ratio), MFR (190° C., 2160 g load) 35.0 g/10 min.]

EMAA3

An ethylene/methacrylic acid copolymer [methacrylic acid content 11% (mass ratio), MFR (190° C., 2160 g load) 8.0 g/10 min.]

EMAA4

An ethylene/methacrylic acid copolymer [methacrylic acid content 10% (mass ratio), MFR (190° C., 2160 g load) 35.0 g/10 min.]

F219DA

A propylene/ethylene random copolymer [MFR (230° C., 2160 g load) 8.0 g/10 min, density of 910 kg/m³, product name: PRIME POLYPRO F219DA manufactured by Prime Polymer Co., Ltd.]

Preparation of Inflation Film

The obtained polymer composition was molded into an inflation film having a thickness of 50 μm using a 50 mmφ inflation film molding machine under the condition of a resin temperature of 170° C. (hereinafter abbreviated as an inflation film (50)). One side of the inflation film (50) was subjected to a corona discharge treatment.

Evaluation

Subsequently, a lamination substrate of polyethylene terephthalate having a thickness of 12 μm [PET (12)]/polyethylene having a thickness of 15 μm [PE (15)] was prepared, and the above-described inflation film was subjected to sandwich lamination by a 65 mmφ laminator (temperature 315° C.) on the PE (15) above via another PE (15), thereby obtaining a sample 1 of PET (12)/PE (30)/inflation film (50). In addition, the PE (30) denotes polyethylene in the form of a film having a thickness of 30 μm.

An inflation film (50) was subjected to heat sealing by a heat sealer (actual seal pressure 0.2 MPa, seal time 0.5 sec.) as a seal layer using the obtained sample 1 while superposing the surfaces of the seal layers. Further, the heat sealing portion was peeled using a tensile tester, and the peel strength in peeling was measured as a seal strength. The measurement results are shown in FIG. 1.

Comparative Example 1

In the same manner as in Example 1, except that the respective components in the composition used in the "Preparation of Polymer Composition" in Example 1 were changed as shown in Tables 1 and 2 below, an inflation film having a thickness of 50 μM was molded and subjected to heat sealing, and then measurement was carried out as in Example 1. The measurement results are shown in FIG. 1.

Example 2 and Comparative Example 2

In the same manner as in Example 1, except that the respective components in the composition used in the "Preparation of Polymer Composition" in Example 1 were changed as shown in Tables 1 and 2 below, an inflation film having a thickness of 30 μm was molded and subjected to heat sealing, and then measurement was carried out as in Example 1. The measurement results are shown in FIG. 1.

Example 3

In the same manner as in Example 1, except that the respective components in the composition used in the "Preparation of Polymer Composition" in Example 1 were changed as shown in Tables 1 and 2 below, an inflation film having a thickness of 50 μm was molded and subjected to heat sealing, and then measurement was carried out as in Example 1. The measurement results are shown in FIG. 1.

Comparative Example 3

In the same manner as in Example 1, except that the respective components in the composition used in the "Preparation of Polymer Composition" in Example 1 were changed as shown in Tables 1 and 2 below, an inflation film having a thickness of 50 μm was molded and subjected to heat sealing, and then measurement was carried out as in Example 1. The measurement results are shown in FIG. 1.

TABLE 1

| | | MFR [g/10 min] | MAA | IBA | Degree of neutralization | Composition of Example 1 | Composition of Comparative Example 1 | Composition of Example 2 | Composition of Comparative Example 2 | Composition of Example 3 | Composition of Comparative Example 3 |
|---|---|---|---|---|---|---|---|---|---|---|---|
| Ionomer component | Ionomer 1 | 1.5 (190° C.) | 12% | — | 36% Zn | 50% | — | 46% | 31% | 50% | 50% |
| | Ionomer 2 | 1.0 (190° C.) | 10% | 10% | 70% Zn | — | 46% | — | — | — | — |
| | EMAA1 | 10.0 (190° C.) | 11% | 8% | — | 33% | 46% | 47% | 32% | 15% | — |
| | EMAA2 | 35.0 (190° C.) | 10% | 10% | — | 10% | — | — | 30% | 10% | — |
| | EMAA3 | 8.0 (190° C.) | 11% | — | — | — | — | — | — | 18% | 33% |
| | EMAA4 | 35.0 (190° C.) | 10% | — | — | — | — | — | — | — | 10% |
| Propylene copolymer | F219DA | 8.0 (230° C.) | — | — | — | 7% | 8% | 7% | 7% | 7% | 7% |
| | Total | | | | | 100% | 100% | 100% | 100% | 100% | 100% |

[%]: % by mass
(Note)
MAA = Methacrylic acid
IBA = Isobutyl acrylate

TABLE 2

|  |  | MFR of sample [g/10 min] | MAA | IBA (*1) | Degree of neutralization |
|---|---|---|---|---|---|
| Example 1 | Sample 1 | 4.8 | 11.4% | 3.9% | 19% Zn |
| Comparative Example 1 | Sample 2 | 4.0 | 10.4% | 8.9% | 35% Zn |
| Example 2 | Sample 3 | 4.6 | 10.5% | 4.0% | 17% Zn |
| Comparative Example 2 | Sample 4 | 9.3 | 10.2% | 6.0% | 12% Zn |
| Example 3 | Sample 5 | 5.0 | 11.4% | 2.4% | 19% Zn |
| Comparative Example 3 | Sample 6 | 5.0 | 11.4% | 0% | 19% Zn |

[%]: % by mass
(*1) α,β-Unsaturated carboxylic acid ester

As shown in FIG. 1, in Examples 1 to 3, a high seal strength is secured when forming a lock seal in a high-temperature range, and further, when forming a peelable seal in a low-temperature range, a peelable seal portion having a higher seal strength than that in Comparative Example 1 could be formed. Moreover, a high seal strength could be obtained over a wide temperature range. Particularly, in Examples 1 and 3 in which two kinds of tercopolymer having different MFRs were used, a wider temperature range in which a peelable seal can be formed (temperature range in which a peelable seal can be formed is approximately from 120 to 170° C.) could be attained, as compared with Example 2 in which only one kind of tercopolymer was used (temperature range in which a peelable seal can be formed is approximately from 120 to 150° C.). Consequently, a peelable seal portion having a high seal strength, as compared with the related art, could be stably formed.

In Comparative Example 1, since the mass of the constituent units derived from the α,β-unsaturated carboxylic acid ester was too high, a stepwise 2-step curve including a portion having a high seal strength and a portion having a low seal strength was seen, but since the seal strength in the portion having a low seal strength is too low, applications requiring easy peelability are restricted.

In addition, in Comparative Example 2, although the seal strength in the low-temperature range was higher than that in the Examples, the variation in the seal strength over temperatures was observed to be conspicuous and not constant, and a stable peelable seal portion could not be obtained. That is, since the seal strength varied depending on the temperature from a portion having a low seal strength to a portion having a high seal strength, the heat sealing temperature range for attaining a desired seal strength was too narrow and productivity deteriorated. Furthermore, in the range of 180 to 190° C. in Example 2 and Comparative Example 2, the interface was not peeled and the seal portion was easily broken.

In Comparative Example 3, a stepwise 2-step curve including a portion having a high seal strength and a portion having a low seal strength was seen, but since the seal strength when forming a lock seal in the high-temperature range is too low and the seal strength in the low-temperature range is also low, applications requiring lock seal property and easy peelability are restricted.

The entire disclosure of Japanese Patent Application No. 2008-143462 is incorporated herein into this specification by reference.

All documents, patent applications and technical specifications recited in this specification are incorporated herein by reference in this specification to the same extent as if each individual publication, patent applications and technical standard was specifically and individually indicated to be incorporated by reference.

The invention claimed is:

1. A polymer composition comprising (A) an ionomer and (B) a propylene-based polymer, wherein:
   the (A) ionomer contains (A1) one or two ethylene/α,β-unsaturated carboxylic acid copolymer(s) and (A2) two ethylene/α,β-unsaturated carboxylic acid/α,β-unsaturated carboxylic acid ester terpolymers;
   the mass of constituent units derived from the α,β-unsaturated carboxylic acid ester is from 1 to 4.5% by mass of the entire mass of the (A) ionomer;
   the two ethylene/α,β-unsaturated carboxylic acid/α,β-unsaturated carboxylic acid ester terpolymers have different melt flow rates (MFR) of a high MFR and a low MFR;
   the ratio of MFRs (high MFR/low MFR) of the two terpolymers is from 3 to 4;
   the high MFR is 30 g/10 min to 40 g/10 min;
   the (A) ionomer contains 50 to 68% by mass of the (A1) one or two ethylene/α,β-unsaturated carboxylic acid copolymer(s) based on the polymer composition; and
   the content of the (B) propylene-based polymer is from 5 to 15 parts by mass based on 100 parts by mass of the polymer composition.

2. The polymer composition according to claim 1, wherein the content of the (A) ionomer is from 85 to 95 parts by mass based on 100 parts by mass of the polymer composition.

3. The polymer composition according to claim 1, wherein the degree of neutralization of acid group in the ionomer is from 10 to 40%.

4. The polymer composition according to claim 1, wherein the α,β-unsaturated carboxylic acid ester of the ethylene/α,β-unsaturated carboxylic acid/α,β-unsaturated carboxylic acid ester terpolymer is a lower alkyl ester of an α,β-unsaturated carboxylic acid, an alkyl group of the alkyl ester having from 2 to 5 carbon atoms.

5. The polymer composition according to claim 1, wherein:
   the α,β-unsaturated carboxylic acid constituting the ethylene/α,β-unsaturated carboxylic acid copolymer is selected from the group consisting of an acrylic acid and a methacrylic acid,
   the α,β-unsaturated carboxylic acid constituting the terpolymers is selected from the group consisting of an acrylic acid and a methacrylic acid, and the α,β-unsaturated carboxylic acid ester constituting the terpolymers is selected from the group consisting of a lower alkyl ester of an acrylic acid, an alkyl group of the alkyl ester having from 2 to 5 carbon atoms, and a lower alkyl ester of a methacrylic acid, an alkyl group of the alkyl ester having from 2 to 5 carbon atoms.

6. The polymer composition according to claim 5,
wherein the α,β-unsaturated carboxylic acid ester constituting the terpolymers is an alkyl ester of an acrylic acid, an alkyl group of the alkyl ester having 4 carbon atoms.

7. The polymer composition according to claim 1,
wherein the mass of constituent units derived from the α,β-unsaturated carboxylic acid ester is from 2 to 4% by mass of the entire mass of the (A) ionomer.

8. The polymer composition according to claim 1,
wherein the (A) ionomer is formed of an ethylene/(meth)acrylic acid copolymer, an ethylene/(meth)acrylic acid/(meth)acrylic acid ester terpolymer having a melt flow rate (MFR) of 30 g/10 min to 40 g/10 min, and an ethylene/(meth)acrylic acid/(meth)acrylic acid ester terpolymer having an MFR from 1 g/10 min to 30 g/10 min, and is a Zn ionomer with an MFR ratio (high MFR/low MFR) of from 3 to 4, and the (B) propylene-based polymer is a propylene/ethylene copolymer.

9. The polymer composition according to claim 8,
wherein the MFR of the (B) propylene-based polymer is from 0.5 to 100 g/10 min.

10. The polymer composition according to claim 1,
wherein the low MFR is 1 g/10 min to 30 g/10 min.

11. The polymer composition according to claim 1,
wherein the one or two ethylene/α,β-unsaturated carboxylic acid copolymer(s) is crosslinked with the two ethylene/α,β-unsaturated carboxylic acid/α,β-unsaturated carboxylic acid ester terpolymers by metal ions.

12. A laminated packaging material comprising:
a base material; and
a sealing material layer laminated on the base material and comprising the polymer composition of claim 1.

* * * * *